Feb. 26, 1957  B. SASSEN  2,782,891
SAFETY CONTROLS
Filed Sept. 24, 1952
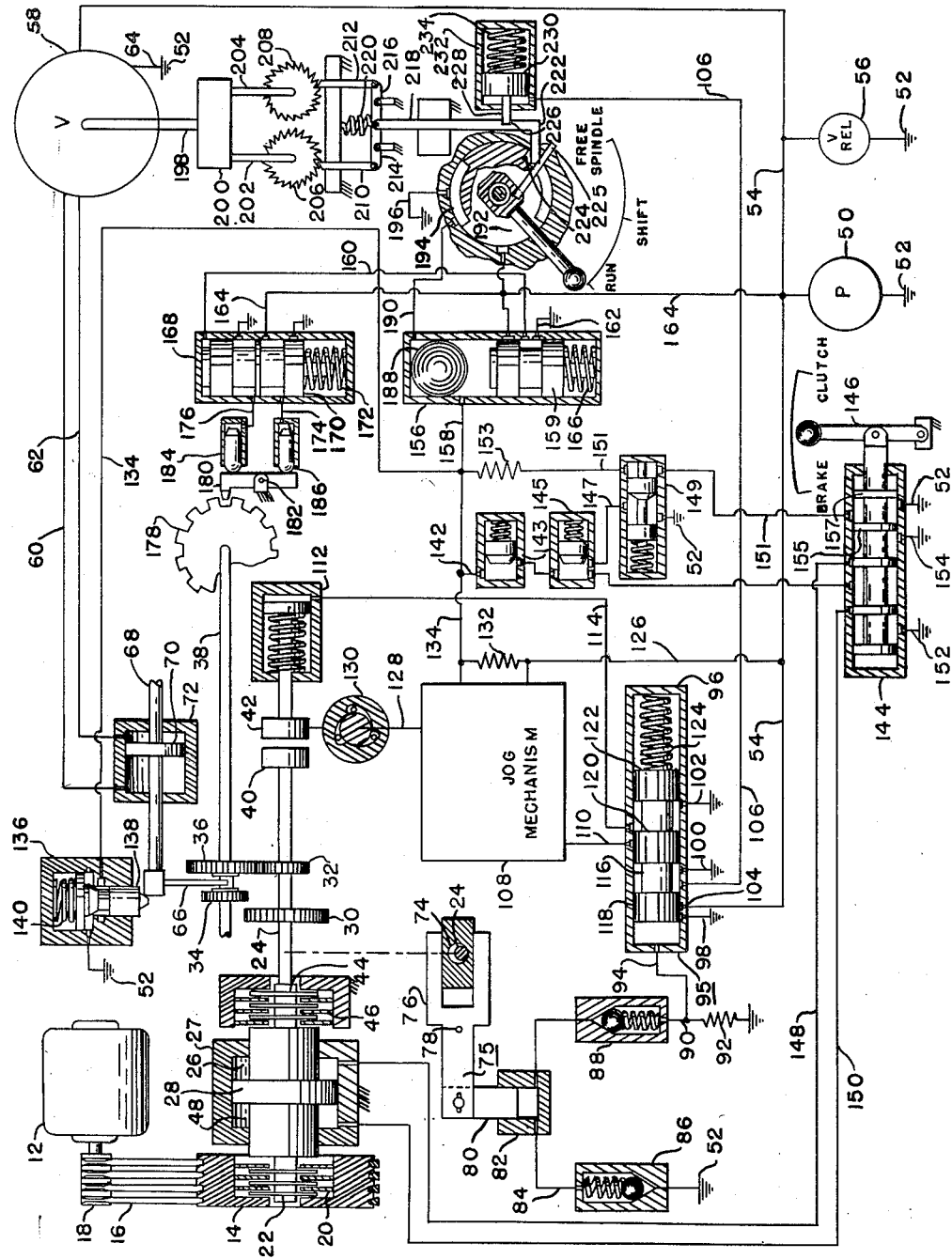
INVENTOR.
BY Bernard Sassen
Woodling and Krost,
attys.

United States Patent Office 2,782,891
Patented Feb. 26, 1957

2,782,891
SAFETY CONTROLS

Bernard Sassen, Sidney, Ohio, assignor to
The Monarch Machine Tool Company

Application September 24, 1952, Serial No. 311,195

8 Claims. (Cl. 192—4)

Many machine tools have movable gear trains to provide a plurality of selectable speeds to a work driver or tool driver in the machine tool. In some cases, particularly when the machine tool is large, it is difficult to shift the gears from one gear train to another and it becomes advantageous to shift from one gear train to another by power. However, this results in the disadvantage that the operator of the machine tool has no feel of the actual gear shifting. Even a skilled operator may shift gears on such a machine while they are under load or running too fast, which action may result in damage to the gear train.

On power shifted gear trains it is advantageous to supply a secondary, preferably intermittent, power source to jog the gear train so that the gears may properly engage with each other and not "hang up." Most efficient use of a jogger requires that of several members that are jogged relative to each other, at least one should be held stationary. Thus, a brake may advantageously be applied to a shaft in the gear train.

It is clearly apparent that proper interlocking safety controls must be provided to prevent injury to the parts of such an arrangement. This application is a continuation-in-part of the application for patent by Bernard Sassen, Serial Number 226,072, filed May 12, 1951, now forfeited, and this application discloses how such safety controls can be utilized in said prior application.

It is an object of this invention to prevent selecting a new gear train until the speeds of the component parts are at or below a safe speed.

It is a further object to provide a clutch between the jogger and the gear train, which clutch may only be engaged when the members are not rotating relative to each other above a safe speed.

It is another object to automatically brake a driven member in the gear train when the driven member is not being driven through the gear train.

It is a further object to provide manually operable means for disengaging the brake on the driven member of the gear train.

It is a further object to provide a clutch and brake combination to drive the gear train and to provide means to control the actuation of the clutch and brake whereby the clutch and brake will not be engaged too rapidly.

These and further objects will be apparent upon inspection of the following specification and the attached drawing in which the single figure represents a schematic arrangement of the parts in the preferable embodiment of this invention.

In the drawing, a motor 12 represents the main drive motor of the machine tool of this invention, and this motor 12 drives a pulley 14 by means of belts 16 and a motor pulley 18. Pulley 14 contains clutch facings 20 which are engageable by clutch facings 22 of the gear train input shaft 24. The clutch facings 20 and 22 are engaged by forcing fluid into volume 26 which forces piston 28 to the left, as shown in the drawing, relative to cylinder 27. The input shaft 24 carries gears 30 and 32 which may be selectively engaged with slideable gears 34 and 36 which are splined to gear train output shaft 38. Shaft 24 further carries a clutch facing 40 which may be engaged by the jogger clutch facing 42 as is hereinafter described. Shaft 24 also carries drive brake facings 44 which may be engaged with stationary facings 46 by introducing hydraulic fluid under pressure into volume 48 thereby forcing piston 28 to the right as seen in the drawing.

A pump 50 is provided to draw hydraulic fluid from the sump 52 and introduce it under pressure into pump output line 54. The maximum pressure in this line 54 is limited by relief valve 56 which discharges excessive fluid back into the sump 52. The line 54 furnishes fluid under pressure to the selector valve 58 which has internal passages, not shown, which may selectively conduct the fluid under pressure into line 60 or 62 while discharging the other line to the sump 52 through line 64.

The slidable gears 34 and 36 are controlled by a yoke 66 which is connected to piston rod 68. Rod 68 carries a piston 70 which is embraced by cylinder 72. It can be seen that when fluid under pressure is introduced into line 60 and line 62 is opened to the drain, the piston moves to the right to the position shown, and gears 32 and 36 are put into engagement. When the fluid under pressure is introduced into line 62 and line 60 is drained, the piston 70 will shift to the left causing engagement between gears 30 and 34.

It is understood that a plurality of shiftable gear sets could be used, and by means of a plurality of intermediate shafts the number of gear ratios obtainable could be extended to any desired range. Machine tools ordinarily have sixteen or more speeds which are obtained by selecting various power transmitting paths through a gear train having several intermediate shafts between the input and output shafts. The shaft 38, however, is the output shaft.

Shaft 24 also drives a speed indicating unit 75 which comprises an eccentric or crank 74 and this eccentric in turn drives a lever 76 which oscillates about its pivot 78. The other end of this lever carries a piston 80 which reciprocates in a cylinder 82. This cylinder is connected by a line 84 to take suction from sump 52 through a suction valve 86, and discharge through a valve 88 into a line 90. This speed indicating unit 75 thus comprises a speed pump which gives a pressure indication in line 90 as to the rotative speed of shaft 24. The line 90 is connected through a restriction 92 to the sump and by means of line 94 to a valve 95 having a housing 96. This housing has ports 98, 100, and 102 to the sump and line 54 is connected thereto at port 104. Also ported to the housing 96 is a line 106 which is connected to a hereinafter described safety lock. A jog mechanism 108 is connected to the valve 95 by a line 110 and a jog clutch engaging cylinder 112 is connected to the valve 95 by a line 114.

The valve housing 96 contains a valve spool 116 which carries thereon lands 118, 120, and 122. The valve spool 116 is urged to the left in the valve housing 96 by means of a spring 124. The spool 116 normally assumes either of two positions in the valve housing 96. In the position shown, the position it assumes when the shaft 24 is running above a predetermined speed, the line 94 is connected to drain through port 98, the line 106 is ported to drain through line 100, and line 114 is ported to drain through port 102.

When the shaft 24 is running at a substantial speed, the speed pump comprising piston 80 and cylinder 82 pumps a substantial volume of hydraulic fluid into line 90, and the pressure drop across resistance 92 is sufficiently substantial to cause the pressure in line 94 to force the spool valve 116 to the right, as shown, against the resistance of the spring 124. When the shaft 24 slows down or stops due to disengaging of the clutch 22 and engaging the brake 44, the speed pump slows down and the flow through the resistance 92 causes the pressure in line 94 to be overcome by the spring 124 thereby causing shifting of the valve spool 116 to the left. The ports and lands of the valve are arranged in such a manner that in this condition the line 54 is connected to line 106 and line 110 is connected to line 114.

The pump line 54 is also connected to a line 126 which supplies hydraulic fluid to the jog mechanism 108 which pulsatingly drives shaft 128 and through one way clutch 130 drives clutch facing 42. The line 126 is also connected to a resistance 132 which passes fluid into a detent line 134, which line is connected to the jog mechanism 108 and is connected to a detent valve 136. This valve has a plunger 138 which is raised from its seated position when the gears are not in complete mesh. This plunger acts as a mechanical detent for it is held down by spring 140, and has the additional function of opening line 134 to the sump 52 when the gears are not fully in mesh. The pressure in this line serves as an indication as to whether or not the gears are engaged, for when the plunger 138 is raised the pressure in line 134 drops to a very small value. This indication is used in the jogger mechanism, for there is a valve in the jogger which admits fluid under pressure from line 126 to the jogger motor and to line 110 whenever there is a substantial pressure drop in line 134.

Detent line 134 is also connected to a line 142 which line supplies fluid pressure to a clutch-brake valve 144. Interposed in line 142 are relief valves 143 and 145. Relief valve 143 is set at a comparatively high value and valve 145 is set at a comparatively low value and it merely keeps the system full of hydraulic fluid. Valve 145 has a drain 147 through a valve 149 to the sump 52. An additional line 151 containing a restriction 153 is connected between line 134 and the valve 149 and thence goes to the clutch-brake valve 144. Two lands 155 and 157 on this valve are arranged to prevent connection of the line 151 to the sump 52 when the handle 146 is in clutch or brake position but allow such a connection when in neutral position. When the handle 146 of this valve is moved to the right or clutch position, the land 155 cuts off flow from line 151 to the sump and pressure in this line builds up due to flow through restriction 153. The pressure buildup moves valve 149 slowly to the left and this slowly cuts off drain through line 147 which provides slow pressure buildup in the lower portion of line 142. This buildup provides even and proper engagement of the clutch. Also, when the handle 146 is moved to the right, the line 142 is connected to line 148 which supplies fluid pressure to volume 26 which pressure engages the clutch facings 20 and 22. At the same time line 150, which is connected to the volume 48, is connected to the drain at 152. When the handle 146 is moved to the left or brake position, line 150 is connected to the fluid pressure source 142, and line 148 is connected to a drain 154, thus causing brake engagement at the correct rate.

The detent line 134 is also connected to a valve 156 by means of a line 158. The valve 156 carries a spool 159 therein which spool has an upper and lower position, with the lower position shown, it opens a line 160 to a drain 162, but when in the upper position it connects line 160 to a line 164 leading to the pump output line 54, and a drain 162 is closed off. A spring 166 urges the spool 159 to the upper position.

The line 164 is also connected to a valve 168 which contains a spool 170. This spool is urged upwardly by a spring 172. This valve carries appropriate lands and ports so that while it is in the upper position, as shown, the fluid pressure line 164 is connected to a line 174 and a line 176 is connected to drain to the sump 52. Should the fluid pressure in line 160, which is connected to the upper volume of valve 168 above the spool 170, rise sufficiently to overcome the force of the spring 172, the valve spool will move to its lower position wherein fluid pressure from line 164 is connected to line 176 and line 174 is connected to the sump 52.

The shaft 38 carries a notched brake disc 178, and this disc is engageable by a dog 180 which is pivoted on the frame as at 182. The dog 180 is engaged with the brake disc by a piston and cylinder combination 184. When there is fluid pressure in line 176, the piston extends from its cylinder to cause such engagement. The dog 180 is removed from engagement with the brake disc 178 by means of piston-cylinder combination 186 which is connected to line 174. When there is fluid pressure in line 174, this piston extends and rocks the dog about its pivot 182 out of engagement.

The valve body 156 also carries therein a ball 188 which acts as a separate plunger to depress valve spool 159. Line 190 is connected to the chamber above ball 188 and is also connected to a shift control valve 192. Shift control valve 192 has three positions, "run," "shift," and "free spindle," and while shift control valve 192 is in the "run" or "shift" position the line 190 is connected to the sump 52 through a groove 194 in the valve and a line 196. When the shift control valve 192 is in the "free spindle" position, the line 190 is connected through groove 194 to the pressure fluid line 164. Shift control valve 192 carries a stop 225 which is adapted to engage a hereinafter described locking plunger 228. Stop 225 prevents the shift control valve 192 from being moved to "free spindle" position until the gear train is running below a predetermined speed. Shift control valve 192 may have means, such as are disclosed in said prior application, requiring that the valve 192 be placed in "run" position before the motor 12 will drive the driven shaft 38.

The selector valve 58 is turned by a shaft 198 and this shaft is the output of a differential 200, which differential has input shafts 202 and 204. These shafts may be controlled in any appropriate manner to turn the selector valve 58. Shaft 202 carries a notched disc 206 and shaft 204 carries a notched disc 208, which discs are engageable by plungers 210 and 212, respectively, which slide in the frame of the machine. These plungers are pinned at their opposite ends to levers 214 and 216, respectively, which are pivoted at their mid points to the frame and their other extremities are pivoted together and to a sliding member 218. This sliding member is urged upwardly, in the drawing, by a spring 220 and the member 218 carries on its opposite end an arm 222 which is engageable by a face 224 in the shift control valve 192. When the shift control valve 192 is moved from the "shift" to the "run" position, the face 224 positively draws member 218 downwardly against the urging of spring 220, and plungers 210 and 212 rise to engage discs 206 and 208 to prevent rotation thereof. Member 218 has a notch 226 therein which is engaged by a locking plunger 228 carried on a piston 230. A cylinder 232 embraces the piston and a spring 234 is contained therein to urge the locking plunger into the notch 226. The volume under the piston 230 is connected to line 106.

*Operation*

It is first presumed that the machine tool is running in its usual manner. The motor 12 is rotating driving pulley 14, the gears 32 and 36 are engaged, as shown, allowing detent valve 136 to be closed, thereby causing high pressure in detent line 134. This line is connected to line 142, the input of the brake-clutch valve 144, and with this valve in the clutch position there is high pressure in volume 26 causing strong clutch action. With shaft 24 rotating at a comparatively high velocity, the speed pump 80—82 discharges through line 94 and causes the spool 116 to remain to the right. This action drains line 106 which latches plunger 228 into notch 226, thereby preventing rotation of the selector valve 58. The spool 116 being in the right-most position prevents engagement of the jog clutch 42 by draining line 114 and cylinder 112. The high pressure in detent line 134 gives indication to the jog mechanism that the jog motor should not run, and the pressure in line 134 communicates itself to line 158 thereby depressing spool 159. This action drains a line 160 and allows spool 170 to rise, thereby causing communication between pressure line 164 and line 174 causing the dog 180 to be disengaged from disc 178.

When the operator desires to shift speeds, he moves the shift control valve 192 to the shift position, and moves the brake-clutch valve to either its brake or neutral center position. The shaft 24 slows down to a predetermined low speed where the entire output of the speed pump 80—82 can pass through resistance 92, and the spring 124 moves the valve spool 116 to the left causing communication between line 54 and line 106, and communication between line 110 and line 114. With high pressure in line 106 the latching member 228 is withdrawn from notch 226 and member 218 is pulled upwardly by spring 220 to cause plungers 210 and 212 to become disengaged from notched discs 206 and 208, respectively.

Now the operator can turn the selector valve 58 by turning either or both of shafts 202 and 204. When the gear shifting starts, the detent plunger 138 is unseated and the pressure in line 134 drops to a low value. Line 134 is connected to line 142, so the brake 44—46 is substantially released if it should have been on. This drop in pressure also serves as an indication to the jog mechanism 108 that the jog motor should operate, and pressure rises in line 110 which now communicates with line 114 to engage the clutch faces 40 and 42. The drop in pressure in line 134 also drops the pressure in line 158 causing the spool 159 to rise and thereby causes communication between line 164 and line 160. This action depresses plunger 170, thereby causing piston cylinder combination 184 to cause the dog 180 to engage the brake disc 178 thereby locking shaft 38. This condition exists until the selected gears are engaged and the detent plunger 138 is again allowed to seat. Seating 138 causes pressure rise in line 134 which stops the jogger, disengages the jogger clutch 42, engages the brake 44, should the lever 146 be in the brake position, and disengages the dog 180 from disc 178.

Should the operator desire to start the machine, he would move the shift control valve 192 from the "shift" to the "run" position, and this action would cause face 224 to draw lever 222 and member 218 to the position shown. Engagement of the clutch 20—22 would cause shaft 38 to rotate at its new velocity, and rotation of shaft 24 would cause shifting of the valve spool 116 to the right, to the position shown, and the latching plunger 228 would drop into notch 226.

Should the operator desire to have a freely rotatable spindle, means could be provided to keep the final gears out of engagement. The operator would actuate this means and move the shift control valve 192 to the "free spindle" position. The shift control valve 192 may only be moved to the "free spindle" position when the gear train or shaft 24 is running below a predetermined speed. In this "free spindle" position, line 164 is connected through groove 194 to line 190, and this causes ball 188 to be depressed, thereby depressing spool 159. This action causes disengagement of dog 180 from disc 178.

It is clearly apparent that this invention provides interlocking safety control means which removes the chance of human error and resultant machine damage. Although this invention has been described in its preferred embodiment, numerous changes and modifications may be made within the scope of the invention. It is therefore desired that the scope of the following claims be definitive of the scope of the invention.

What is claimed is:

1. In a power operated gear shifting mechanism, a selector valve, locking means for said selector valve a gear train having an input and an output shaft, a speed responsive device connected to said gear train arranged to prevent gear shifting while said gear train is rotating above a predetermined speed, said speed responsive device comprising a pump which displaces fluid substantially proportionately to the speed of one member of said gear train and discharges it through an orifice, and a speed valve connected between said pump and said orifice and having means to permit releasing of said locking means so that said selector valve may be caused to select.

2. In a power operated gear shifting mechanism, a selector valve to select the gears to be shifted, a gear train having an input and an output shaft, a brake on said output shaft, a selective device connected to said brake to prevent engagement of said brake when the gears are engaged, said selective device actuating a signaling device for causing a signal when said gears are disengaged, and means responsive to said signal to cause engagement of said brake during said signal and prevent engagement of said brake during the absence of said signal.

3. In a power operated gear shifting mechanism, a gear train having an input and an output shaft, a jogger connected to one element of a jog clutch, the other element of said jog clutch being connected to one of said shafts, a speed responsive device connected to said gear train arranged to prevent gear shifting and engagement of said jog clutch while said gear train is rotating above a predetermined speed, said speed responsive device comprising a pump which displaces fluid substantially proportionately to the speed of one element of said gear train and discharges it through an orifice, and a speed valve connected between said pump and said orifice.

4. In a power operated gear shifting mechanism having an input and an output shaft, a plurality of power transmitting paths between said input and said output shafts, means to shift from one path to another, a jogger connected in driving relation to one element of a jog clutch, the other element of said jog clutch being connected to one of said shafts, a brake on the other of said shafts, and means responsive to the shifting means to engage said jog clutch and brake so that the jogger jogs one shaft through said jog clutch while said brake holds the other shaft to assist changing from one power transmitting power to another.

5. In a power operated gear shifting mechanism, a gear train, a brake in the gear train, a selective device connected to indication means which is connected to said brake to prevent engagement of said brake when said gears are engaged and to permit engagement of said brake when said gears are disengaged, and a manually operable device operatively connected to said brake to disengage said brake while said gears are disengaged.

6. In a power operated gear shifting mechanism, a gear train having an input and an output shaft, means to drive said input shaft, a brake in said gear train, said brake being engaged while the gears in the gear train are shifting, manually operable means to actuate said brake, and means dependent on the speed of the gear train to prevent complete manual operation of said manually operable means while said gear train is rotating above a predetermined speed.

7. In a mechanism having a drive motor and a gear train having an output shaft and having an input shaft adapted to be driven by said drive motor, the provision of safety control means to promote safe operation of said mechanism, including, a clutch and drive brake selectively operable, said clutch interconnecting said drive motor and said input shaft, first means to alternatively operate said clutch and brake, a jog mechanism to pulsatingly drive a gear in said gear train through a jog clutch, an output brake connected to brake said output shaft, means comprising gear shifting elements, a manual selector member to selectively control the operation of said gear shifting elements, a lock on said selector handle, a manual handle operatively arranged to engage and to disengage said output brake, and second means to prevent operation of said jog mechanism, said manual handle, said jog clutch, and prevent unlocking of said selector handle lock when said input shaft is operating above a predetermined speed.

8. In a mechanism having a drive motor and a gear train having an output shaft and having an input shaft adapted to be driven by said drive motor, the provision of safety control means to promote safe operation of said mechanism, including, a fluid pressure operated clutch and drive brake selectively operable, said clutch interconnecting said drive motor and said input shaft, first fluid pressure means to alternatively operate said clutch and brake, a jog mechanism to pulsatingly drive a gear in said gear train through a jog clutch, an output brake connected to brake said output shaft, means comprising gear shifting elements, a manual selector valve to control the operation of said gear shifting elements, a fluid pressure operated lock on said selector valve, a manual handle operatively arranged to engage and to disengage said output brake, second fluid pressure means to prevent operation of said jog mechanism, and said jog clutch, and prevent unlocking of said selector valve lock when said input shaft is operating above a predetermined speed, third fluid pressure means to operate said output brake during gear shifting and prevent operation thereof when the gears are engaged, fourth fluid pressure means acting through said first fluid pressure means to prevent operation of said drive brake during shifting, and fifth fluid pressure means acting through said first fluid pressure means to cause a slow rise of fluid pressure therein for slow actuation of the selected one of said clutch and drive brake.

References Cited in the file of this patent

UNITED STATES PATENTS

| | | |
|---|---|---|
| 907,711 | Anthony | Dec. 29, 1908 |
| 1,199,640 | Vincent | Sept. 26, 1916 |
| 2,110,173 | Pohl | Mar. 8, 1938 |
| 2,167,790 | Whitehead | Aug. 1, 1939 |
| 2,465,942 | Von K. Sundt | Mar. 29, 1949 |
| 2,500,562 | Oliver | Mar. 14, 1950 |
| 2,505,221 | Tomlinson | Apr. 25, 1950 |
| 2,529,067 | Bennett | Nov. 7, 1950 |
| 2,537,409 | Hassman | Jan. 9, 1951 |
| 2,555,242 | Nenninger | May 29, 1951 |
| 2,557,896 | Saule | June 19, 1951 |
| 2,692,511 | Nallinger | Oct. 26, 1954 |